United States Patent
Hershkovitz et al.

(10) Patent No.: US 11,169,909 B2
(45) Date of Patent: Nov. 9, 2021

(54) FLEXIBLE TEST PROGRAM GENERATION BY ALTERING PREVIOUSLY USED RESOURCES

(71) Applicant: INTERNATIONAL BUSINESS MACHINES CORPORATION, Armonk, NY (US)

(72) Inventors: Oz Dov Hershkovitz, Zichron Yaacov (IL); Ofer Peled, Haifa (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 65 days.

(21) Appl. No.: 16/836,357

(22) Filed: Mar. 31, 2020

(65) Prior Publication Data
US 2021/0303449 A1    Sep. 30, 2021

(51) Int. Cl.
*G06F 11/00* (2006.01)
*G06F 11/36* (2006.01)

(52) U.S. Cl.
CPC ...... *G06F 11/3684* (2013.01); *G06F 11/3664* (2013.01)

(58) Field of Classification Search
CPC .......................... G06F 11/3664; G06F 11/3684
See application file for complete search history.

(56) References Cited

U.S. PATENT DOCUMENTS

| | | | | |
|---|---|---|---|---|
| 5,729,554 A * | 3/1998 | Weir | ..................... | G06F 11/261 714/31 |
| 7,483,824 B1 * | 1/2009 | Hill | ................ | G01R 31/318357 438/14 |
| 2004/0088600 A1 | 5/2004 | Adir | | |
| 2012/0131386 A1 * | 5/2012 | Fournier | ............... | G06F 11/263 714/35 |
| 2012/0204182 A1 | 8/2012 | Doteguchi | | |
| 2013/0191689 A1 * | 7/2013 | Almog | ................ | G06F 11/2236 714/35 |

(Continued)

OTHER PUBLICATIONS

Aziz et al., "Re 1 Est: A Cost Effective Test Case Selection Technique for Modern Software Development,": IEEE 29th International Symposium on Software Reliability Engineering (ISSRE), 2018.11 pages.

(Continued)

*Primary Examiner* — Joshua P Lottich
(74) *Attorney, Agent, or Firm* — Cantor Colburn LLP; Tihon Poltavets (57) ABSTRACT

A method for flexible test program generation is described that alters previously used resources. The method includes scanning, by a test generator, a set of instructions that have been executed by a system under test (SUT) using a reference model of the SUT. The method further includes identifying, by the test generator, a resource for using in a test program by determining an allocation of a first value to the resource by a subset of instructions from the set of instructions, wherein the first value of the resource is not used after the allocation. The method further includes modifying the subset of instructions to allocate a second value to the resource, and adding to the set of instructions, at least one instruction that uses the second value to perform a predetermined operation. The SUT is tested based on a result of the predetermined operation that uses the second value.

20 Claims, 4 Drawing Sheets

(56) References Cited

U.S. PATENT DOCUMENTS

2020/0160932 A1* 5/2020 Motika ................ G11C 29/38

OTHER PUBLICATIONS

Fazlalizadeh et al., "Prioritizing Test Cases for Resource Constraint Environments Using Historical Test Case Performance Data," 2nd IEEE International Conference on Computer Science and Information Technology. 2009. 6 pages.

* cited by examiner

FLEXIBLE TEST PROGRAM GENERATION BY ALTERING PREVIOUSLY USED RESOURCES

BACKGROUND

The present invention relates to computing technology, and particularly to testing of a hardware and, more specifically, to facilitating generation of executable instructions to test the hardware.

Computerized devices control almost every aspect of our life—from writing documents to controlling traffic lights. However, newly designed computerized devices are often error-prone, and thus require a testing phase in which the errors are discovered and corrected. The testing phase is considered one of the most difficult tasks in designing a computerized device. Thorough testing is important, as the cost of not discovering an error may be enormous depending on how the computerized device is utilized.

SUMMARY

According to one or more embodiments of the present invention, a method for flexible test program generation includes altering previously used resources. The method includes scanning, by a test generator, a set of instructions that have been executed by a system under test (SUT) using a reference model of the SUT. The method further includes identifying, by the test generator, a resource for using in a test program by determining an allocation of a first value to the resource by a subset of instructions from the set of instructions, wherein the first value of the resource is not used after the allocation. The method further includes modifying the subset of instructions to allocate a second value to the resource, and adding to the set of instructions, at least one instruction that uses the second value to perform a predetermined operation. The SUT is tested based on a result of the predetermined operation that uses the second value.

According to one or more embodiments of the present invention, a system includes a memory device, and one or more processing units coupled with the memory, and with a system under test (SUT). The one or more processing units perform a method for generating a test program for the SUT. The method includes scanning, by a test generator, a set of instructions that have been executed by a system under test (SUT) using a reference model of the SUT. The method further includes identifying, by the test generator, a resource for using in a test program by determining an allocation of a first value to the resource by a subset of instructions from the set of instructions, wherein the first value of the resource is not used after the allocation. The method further includes modifying the subset of instructions to allocate a second value to the resource, and adding to the set of instructions, at least one instruction that uses the second value to perform a predetermined operation. The SUT is tested based on a result of the predetermined operation that uses the second value.

According to one or more embodiments of the present invention, a computer program product includes a memory storage device having computer executable instructions stored thereon. The computer executable instructions when executed by one or more processing units cause the one of more processing units to perform a method for flexible test program generation by altering previously used resources. The method includes scanning, by a test generator, a set of instructions that have been executed by a system under test (SUT) using a reference model of the SUT. The method further includes identifying, by the test generator, a resource for using in a test program by determining an allocation of a first value to the resource by a subset of instructions from the set of instructions, wherein the first value of the resource is not used after the allocation. The method further includes modifying the subset of instructions to allocate a second value to the resource, and adding to the set of instructions, at least one instruction that uses the second value to perform a predetermined operation. The SUT is tested based on a result of the predetermined operation that uses the second value.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describe having a communications path between two elements and do not imply a direct connection between the elements with no intervening elements/connections between them. All of these variations are considered a part of the specification.

DETAILED DESCRIPTION

Exemplary embodiments of the present invention relate to, among other things, devices, systems, methods, computer-readable media, techniques, and methodologies for flexible test program generation by altering previously used resources for testing a system under test (SUT). The SUT may be a hardware system or a software system. The test programs that are generated can be used to detect one or more failures (or lack thereof) in the SUT.

Product development and testing environments may implement a set of processes and programming tools to investigate the SUT. Typically, users, in this case personnel involved with system development, testing, and production (e.g., software developers, hardware developers, etc.) may use program logs, crash reports, and debuggers to investigate the quality of the SUT such as a software program, a hardware component (e.g., integrated circuit, field programmable gate array, system on a chip, etc.) Testing the SUT during a development cycle may be challenging. The larger the SUT, the more source code and/or hardware components to be tested, and the more challenging the testing may become. A failure may occur during testing of the SUT due to any number of reasons such as source code changes, hardware design change, requirement changes, and environment changes, among other factors.

A technical challenge when generating test programs for a SUT is the lack of available resources of the SUT to use in one or more instructions of a test program. For example, in a case where the SUT is a processing unit, a "resource" can be a register (e.g., general purpose register, special purpose register etc.), a memory location, an interrupt pin, a functional sub-component (e.g., arithmetic logic unit, load-store unit, etc.), or any other portion of the processing unit that can be independently addressed and/or tested. Typically, the SUT has limited resources, which may be used by one or more operations that a user may be performing on the SUT. The technical challenge is, thus, that during test generation, resources are getting used and getting a "free" resource becomes challenging. Common techniques to address such technical challenges is to initiate sequences that free the resources required for the test program and continuing the operation(s) that were using the resources at a later time. However, such techniques introduce new instructions to the ongoing execution of operations, which can interfere with the ongoing operation(s), and in turn can adversely affect performance and efficiency of the SUT.

Technical solutions provided by embodiments of the present invention address such technical challenges. Instead of freeing resources forcefully, embodiments of the present invention identify resources that may be allocated a value, but which are actually not being used. Embodiments of the present invention identify such resource(s) by scanning a set of instructions that have recently been executed by the test generator in its generation process. Further, embodiments of the present invention facilitate changing/modifying one or more instructions that allocate the value to the resource that is not being used, and further, adding one or more instructions that use the modified allocation as part of a test program. One or more embodiments of the present invention ensure that the changes made to the executed instructions do not adversely affect the control flow of the operation(s) being executed.

Figure 1:
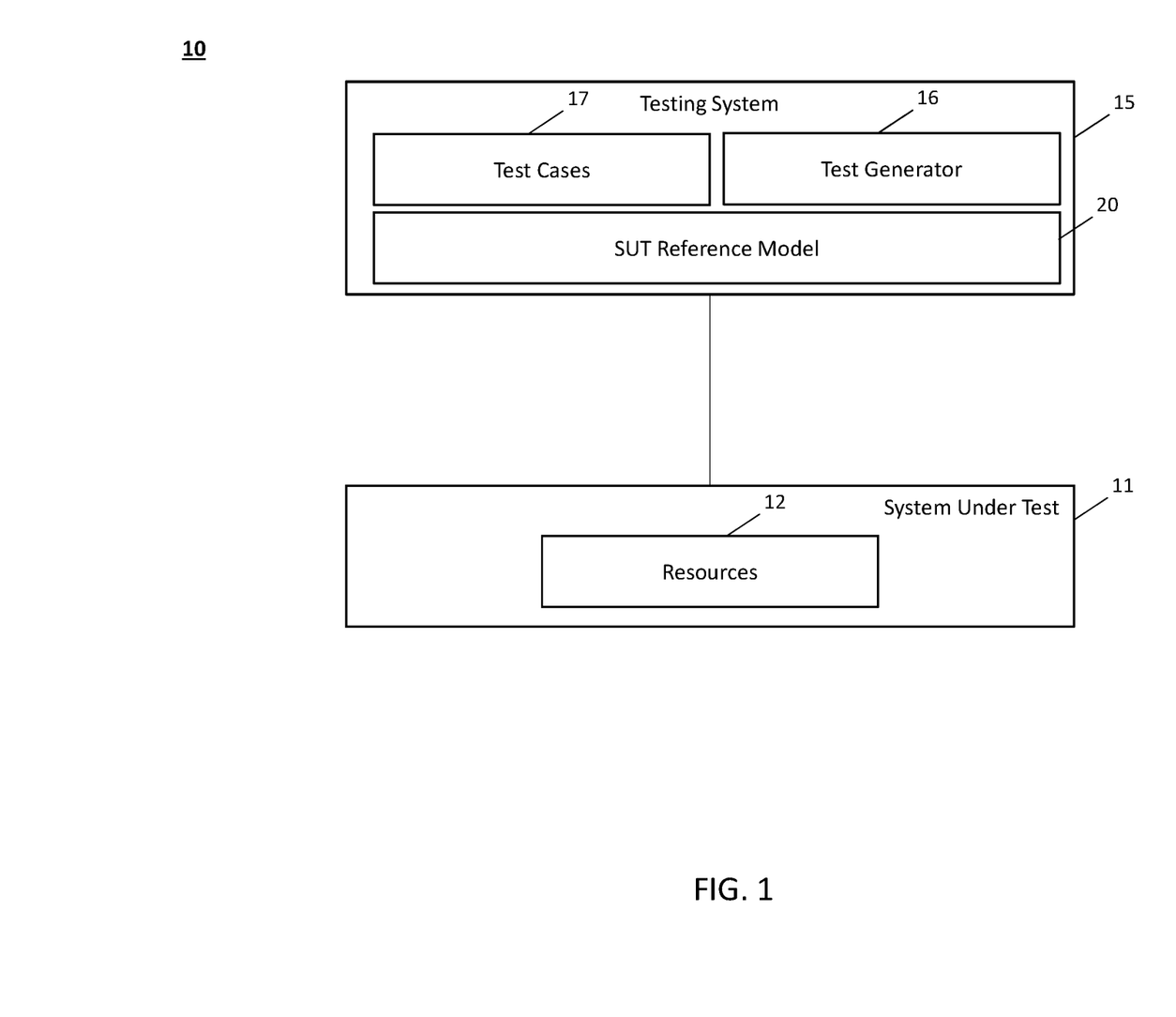
FIG. 1 is a schematic block diagram illustrating testing of a system under test in accordance with one or more example embodiments of the invention.

Referring now to FIG. 1, a schematic block diagram depicts testing of an SUT in accordance with one or more example embodiments of the invention. The depicted system 10 includes a testing system 15 that tests an SUT 11. The SUT 11 includes hardware, software, and/or a combination thereof. For example, the SUT 11 can be an integrated circuit, a system on a chip, a field programmable array board that is programmed, or any other type of hardware. The testing system 15 causes one or more test cases 17 to be executed by the SUT 11.

The testing system 15 provides various inputs to the SUT 11 to execute one or more tests cases 17 so as to exercise various parts of the SUT 11 in an attempt to detect a defect in the operation of the SUT 11. The SUT 11 includes one or more resources 12, such as registers, memory devices, output pins/ports, input pins/ports, processors, and other such components. The testing system 15 includes a test generator 16 that creates the test cases 17. The test cases 17 include test cases that are created offline, i.e., when the SUT 11 is not operating. The test case generator 16 creates the test cases 17 based on a SUT reference model 20. The SUT reference model 20 keeps track of the resources that the test cases 17 can use for/during execution. Further, in one or more embodiments of the present invention, the SUT reference model 20 tracks the state of such resources at a given time. In other words, the reference model 20 is a snapshot of the resources 12 of the SUT 11. For example, the reference model 20 identifies whether a resource is in use (i.e., allocated) or not, a presently allocated value (if any) of a resource 12, a last access of the resource 12, etc. Using the SUT reference model 20, the test generator 16, tracks the history of all instructions that were generated by it and the resources they used.

A test case 17 includes one or more executable instructions that, when executed by the SUT 11, read/write values from/to the resources 12. Further, the test case 17 checks one or more values in particular resources 12 and compares such values with predetermined expected results of the test case 17. If the values match, the test case 17 is deemed to pass, i.e., a failure is not detected in the SUT 11. Alternatively, in the case that the values do not match, the test case 17 is deemed to "fail", i.e., detect a failure in the SUT 11.

The test generator 16 creates a test case 17 to test a particular scenario that can be executed by the SUT 11. The particular scenario requires specific values in one or more resources 12 (e.g., registers). Examples of such scenarios can include, but are not limited to: operations resulting in zero stored at particular location, operations resulting in an overflow, operations resulting in a load hit store condition, and other such use cases.

In one or more embodiments of the present invention, the test generator 16 generates the test cases 17 for the SUT 11 that is offline based on the reference model 20 of the SUT 11. For example, as part of a periodic diagnostic check, the testing system 15 runs test cases 17 for one or more particular scenarios to ensure that the SUT 11 is not experiencing any kind of failure. Accordingly, although the testing system 15 and the SUT 11 are depicted as separate blocks in FIG. 1, in one or more embodiments of the present invention, the testing system 15 can be part of the SUT 11 itself, and diagnoses the SUT 11 at scheduled time and/or intervals.

Figure 2:
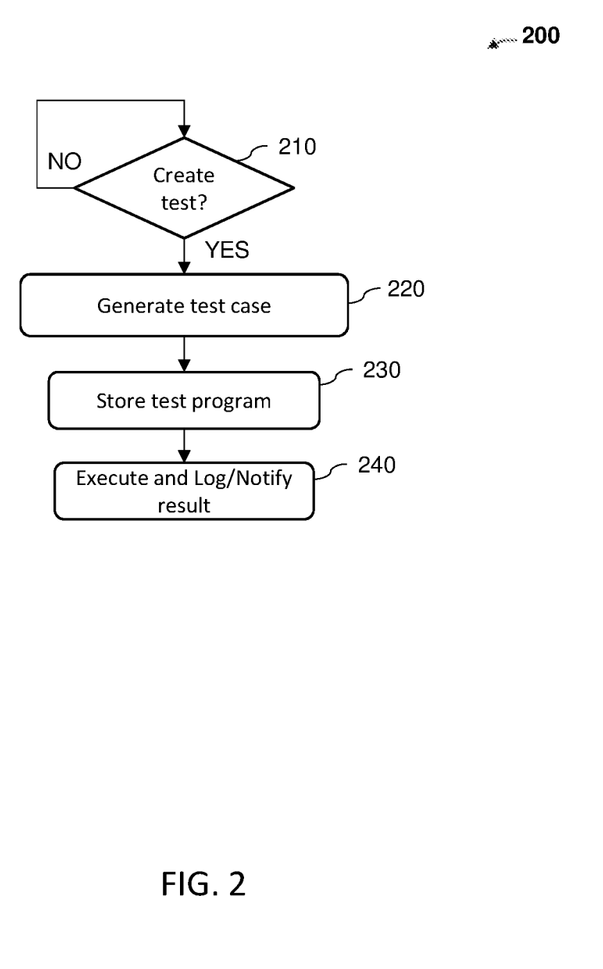
FIG. 2 is a flowchart of a method for flexible test program generation by altering previously used resources according to one or more embodiments of the present invention.

FIG. 2 depicts a method for testing the SUT 11 using the testing system 15 according to one or more embodiments of the present invention. When it is time for the testing system 15 to create a test for the SUT 11, the test generator 16 creates a test case 17 according to one or more particular scenarios that are stored in the testing system 15, at blocks 210 and 220. The test case generator 16 creates the test case 17 based on the SUT reference model 20.

Figure 3:
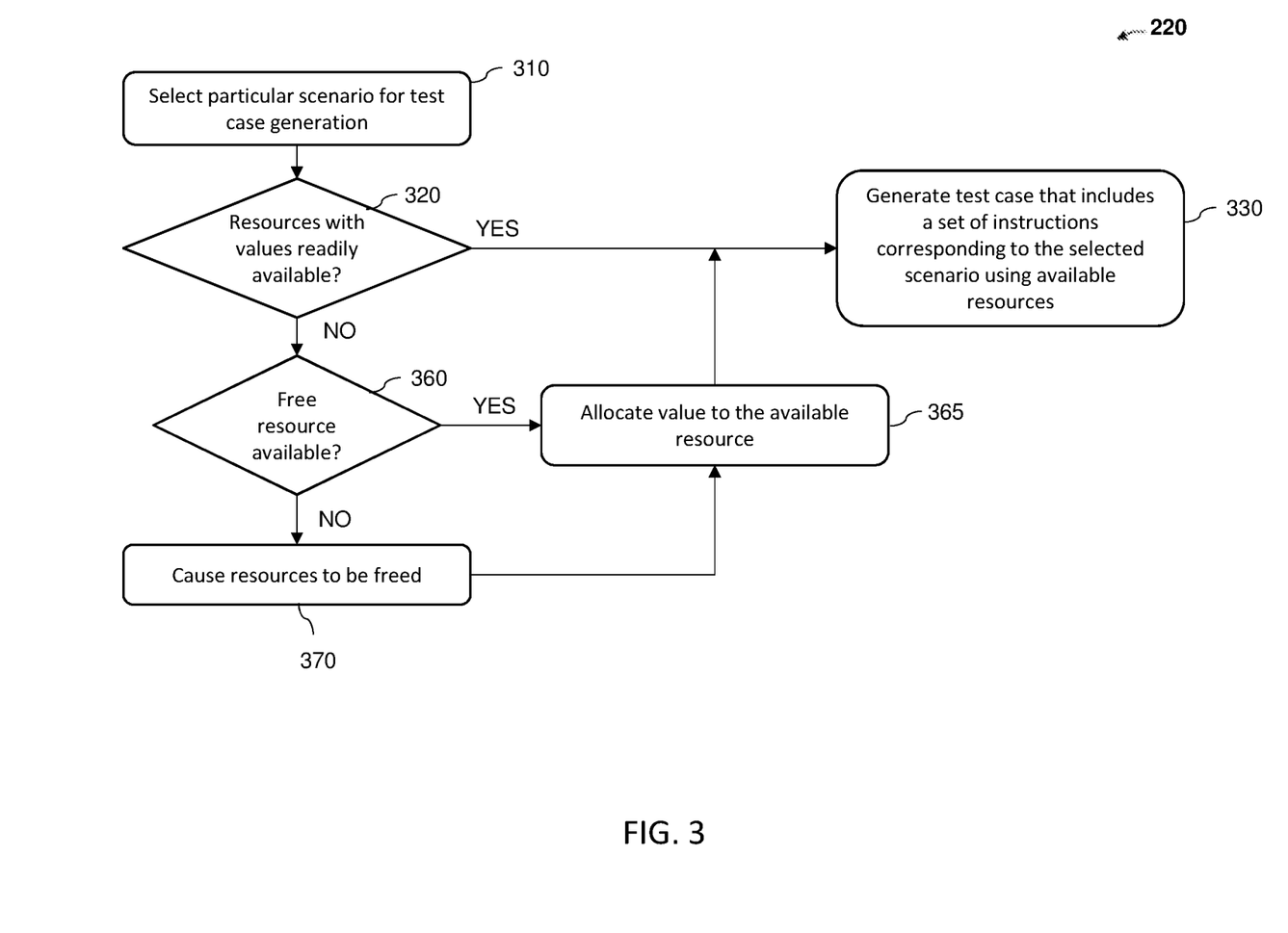
FIG. 3 is a flowchart of a method for test case generation according to one or more embodiments of the present invention.

FIG. 3 depicts a flowchart for a method for generating a test case according to one or more embodiments of the present invention. In one or more embodiments of the present invention, generating the test case 17 includes selecting, by the test generator 16, a particular scenario for the test case 17, at block 310. The test generator 16 can select the particular scenario from a predetermined set of scenarios using round robin selection, sequential selection, randomized selection, and the like. The scenarios provide particular use cases to be tested. For example, a scenario can include loading a particular set of values in one or more general purpose registers, and/or memory locations of the SUT 11, and testing that the expected values were loaded by retrieving values from the same registers and/or memory locations.

Alternatively, or in addition, a scenario can include retrieving a value from a first general purpose register (GPR1), loading a negative of the retrieved value in a second general purpose register (GPR2), and computing a sum of the two register values in the first (or second) general purpose register (GPR1=GPR1+GPR2). The scenario further tests that the resulting value in the first general purpose register is zero (0).

Another scenario can test that a particular interrupt/flag is raised, for example, a divide-by-zero interrupt. In such a case, a first memory location or a general purpose register is loaded with a 0 (zero), and a second memory location or general purpose register is loaded with a non-zero value. Further, an instruction to divide the non-zero value by 0 is executed, and it is tested that the divide-by-zero interrupt is raised.

It is understood that the above are example scenarios, and that in one or more embodiments of the present invention, other scenarios can be tested.

Further, in the method 220, the test generator 16 seeks for available resource 12 for generating a test case 17 for the selected scenario, at block 320. Available resource 12 can be a resource 12 that was not yet used or a resource 12 that was used and contains the required value according to the selected scenario for which the test case 17 is being generated. For example, if the above described divide-by-zero scenario is to be tested, availability of a first general purpose register having a zero and a second general purpose register with a non-zero value is checked. Alternatively, in the case of testing the sum of registers being zero scenario described above, two registers with matching values, but opposite signs have to be available. It is to be noted that because the number of resources 12 is limited, the reference model 20 may not contain the resources having values that can be readily used by the test generator 16.

To determine that the resource 12 is available, the test generator 16 scans and analyzes instructions that have been executed by the SUT 11. The reference model 20 tracks a predetermined set of instructions that the SUT 11 has recently executed. The test generator 16 scans through a set of instruction that was already generated by itself, i.e., the test generator 16. For example, consider that the resource 12 was allocated a value by a first instruction at a first timepoint t1, which occurs prior to a second timepoint t2 at which the test generator 16 presently is generating an instruction in. The test generator 16 scans the set of instructions that have been executed prior to timepoint t2 to seek the one or more available resources 12. Determining that the resource 12 is available also includes checking that the value allocated to the resource 12 is not used by another instruction until the test case generation time occurs. For example, consider the set of instructions from time t1 to time t2 in Table 1. In this case the resource 12 was allocated a value and no other instruction used it till timepoint t2. It is understood that this is one possible example of a set of instructions and that several other sets of instructions are possible.

Looking at the example case in Table 1, based on the set of instructions executed, the test generator 16 determines that it is safe to act as if the load instruction (instruction N) placed the required value at GPR3, which can be used by the test case at t2, because no other instruction will get influenced by the test case (neither address A, nor GPR3 was used by any) and the load instruction itself can be generated in the same way as it did originally.

TABLE 1

Instructions 1 to N − 1: Some instructions, one of it touching GPR3 (general purpose register 3) so it now has some value in it.
Time t1:
Instruction N: A load instruction that loads data from address A to GPR3
Instructions N + 1 to M − 1: More instructions that do not touch GPR3
Time t2: Alter value of memory A to 0, which in turn will lead to GPR3 getting the value 0
Instructions M + 1: A divide instruction that divides GPR7 by GPR3 (causes a divide by zero exception)

Another example case is shown in Table 2. Consider that in the reference model 20 instructions executed instructions that load value from memory location A to GPR7. Further, say that the memory address A is initialized to 147921 (or any other value) and GPR7 gets written with the value 147921, per the load instruction. Further, the executed instructions do not use GPR7 and memory address A. Now consider that the test case generator 16 has selected a test case scenario to create an Add instruction with result of zero and is scanning for resource candidates. GPR5, for example, has value 890241, and the test case generator 16 is going to use it for the test. GPR5 can be dictated by the selected scenario, the user, or can be randomly selected. The test case generator 16 scans for the resource candidates and determines that GPR7 is not being used, and hence, an available resource. Here, the test case generator 16 can alter the initial value of GPR7 to be −890241 by changing the value in memory location A to be −890241 and so GPR7 will be written with this value in the past. Here, the test case generator 16 changes the earlier instruction that initializes A, and the test case 17 can add GPR5 with GPR7 and compare the result with 0.

TABLE 2

Instructions 1 to N − 1: Some instructions, one of it initializing memory address A with value 147921.
Time t1:
Instruction N: A load instruction that loads data value from address A to GPR7
Instructions N + 1 to M − 1: More instructions that do not touch neither GPR7 nor memory address A; GPR5 has value 890241 because of these instructions.
Time t2: Alter value of A to (−890241), which in turn will place this value in GPR 7
Instruction M: Add instructions that takes the sum of GPR5 and GPR7 and place it in GPR7

Additionally, in one or more embodiments of the present invention, the user can specify that a particular resource 12 cannot be used by the test generator 16 in the test case 17. For example, the test generator 16 can be provided such pre-conditions via an interface, such as a graphical user interface, an application programming interface, etc. The test generator 16, accordingly, does not consider a resource 12 as an available resource if such an explicit constraint has been indicated, even if the resource 12 meets other conditions of an available resource.

Referring to the flowchart in FIG. 3, if resources 12 with required values are readily available, the test generator 16 generates the test case 17 by adding a set of instructions for the selected scenario to be tested, at block 330. In this case, the instructions that are added use the identified available resources 12. Because the resources 12 already have values that can be used for testing the selected scenario, no additional instructions are required to be interjected for allocating particular values. The instructions for the test case are added to the present pool of instructions being executed by the SUT 11.

The test case 17 that is generated does not change any resource 12 that was used by another instruction or resource.

In addition, in one or more embodiments of the present invention, the test generator 16, by adding instructions for the test case 17, does not change a value that is allocated to a resource in a way that can lead to a different flow of the operations. For example, any value of a load instruction is legal, but if a value in an arithmetic instruction is altered by the test generator 16, such change cannot cause an interrupt, or any other flag, that would not have resulted by the original instructions. For example, an overflow exception cannot be caused by the test case 17, when the original instructions would not have caused such an exception. The reverse case is also true, that is if the original instructions would have caused the overflow (or any other) exception, the changed values of the resource(s), because of the test case 17, should also result in the same overflow (or other) exception.

The test generator 16, accordingly, identifies a resource 12 for using in a test case 17 by determining an allocation of a first value to the resource by a subset of instructions from the set of instructions, wherein the first value of the resource is not read by any other instruction from the set of instructions, after the allocation is performed.

In the case that the resources 12 with required values are not available (NO branch of block 320), the test generator determines if a desired number of resources 12 are available (i.e. "free"), at block 360. In one or more embodiments of the present invention, the test generator 16 determines if the desired number of resources for the scenario are available, but have other values stored in them at present. As noted earlier, the probability of having available resources 12 itself is low because the ongoing operations use the resources 12. Here, the difference between available resources with required values and available resources (without required values) is that the former already have values that the test case 17 can directly use, and instead in the latter, the test generator 16 has to first assign the required values to the available resources as an additional step. Determining that the resource 12 is available is the same in both cases. Accordingly, in the example set of instructions in Table 1, GPR3 will still be determined as the available resource, just not available resource with required value.

Accordingly, as per the example in Table 2, once the available resource 12 is identified, the test generator 16 assigns the required value to the available resource 12, at block 365. In one or more embodiments of the present invention, the test generator 16 assigns the value to the available resource 12 by modifying a subset of instructions. Instead of the first value that the subset of instructions assigned to the resource 12, the subset is modified to assign a second value to the resource 12. For instance, in the example from table 1, the instruction N can be modified to two load instructions, each loading different half of GPR3. In this case we will have to fix 2 values in memory, the one that loaded the right half and the one that loaded the left half. In one or more embodiments of the present invention, as in the example in Table 2, the value in the address A is changed and the instruction N itself is not changed. In this case, the test generator 16 ensures that the address A is not used by any other instruction in the set of instructions.

The test generator 16, further generates the test case 17 using the identified available resource 12 (e.g., GPR3, GPR7), at block 330. Accordingly, a test case 17 is generated dynamically without having to temporarily store and restore resources 12.

If resources 12 are not available, the test generator 16 has to cause the required resources 12 to be freed as per the selected scenario, at block 370. Freeing resources 12 can include adding instructions to save values of one or more resources to a temporary location, such as a memory buffer. Such temporary writes can delay the execution of the test case 17. Further, the test generator 16 assigns values to the resources 12 that are now freed, at block 365, and subsequently the instructions for the test case 17 are added. In one or more embodiments of the present invention, instructions may be interjected to restore the values of the resources from the temporary location(s).

Referring back to the flowchart of method 200 in FIG. 2, now that the instructions for executing the test case 17 are created and added to the present pool of instructions being executed, the set of instructions from t1 to t2 and the additional instructions for the test case 17 are stored as a test program, at block 230. In one or more embodiments of the present invention, executing the test case 17 can include storing (on a storage disk) the present set of instructions as the test program that can be executed at a later time. During execution of the test program, the SUT 11 executes the instructions from t1 to t2, and those corresponding to the test case 17 that tests the selected scenario, at block 240. The result of the executed test case is logged. Alternatively, or in addition, the testing system 15 notifies the user of the result.

In one or more embodiments of the present invention, the user notification is sent only in case the test case fails. The notification can include email, instant message, text message, audio/visual notification (e.g., beep, popup etc.) or any other form of electronic communication. In one or more embodiments of the present invention, in case the test case 17 fails, the SUT 11 may be suspended until the detected failure is diagnosed and corrected.

Accordingly, embodiments of the present invention address the technical challenges of creating additional instructions for test cases, by using instructions that are already part of an execution scenario. Embodiments of the present invention maintain history of a set of instructions being executed, and if and when a certain value is not available, it is determined whether a change in history is a safe, such that a change in the value of a resource will appear as if this value had been placed there from the beginning without changing anything in the history flow until the test case is created.

Figure 4:
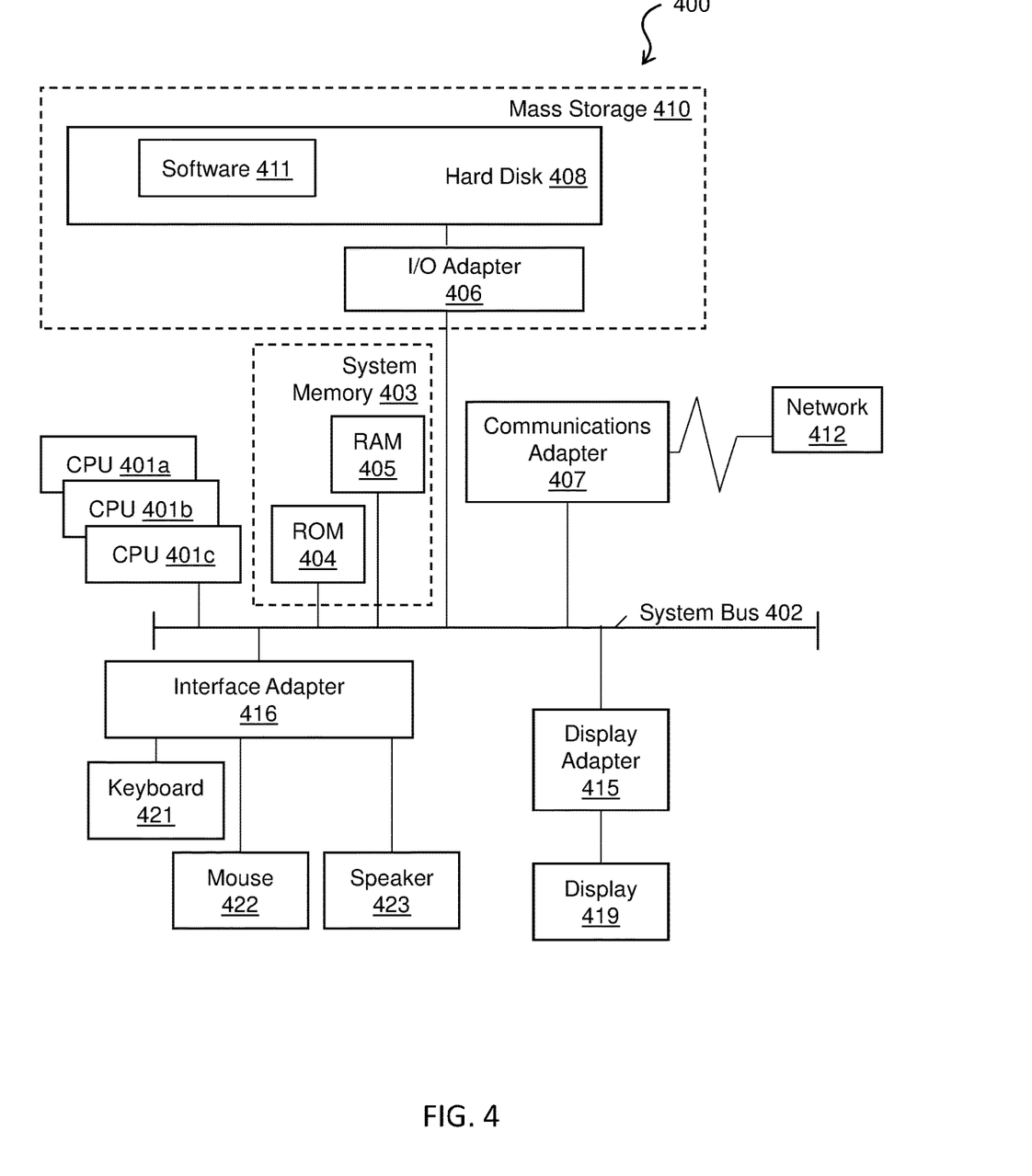
FIG. 4 is a block diagram of an example computing system.

Turning now to FIG. 4, a computer system 400 is generally shown in accordance with an embodiment. The computer system 400 can be an electronic, computer framework comprising and/or employing any number and combination of computing devices and networks utilizing various communication technologies, as described herein. The computer system 400 can be easily scalable, extensible, and modular, with the ability to change to different services or reconfigure some features independently of others. The computer system 400 may be, for example, a server, desktop computer, laptop computer, tablet computer, or smartphone. In some examples, computer system 400 may be a cloud computing node. Computer system 400 may be described in the general context of computer system executable instructions, such as program modules, being executed by a computer system. Generally, program modules may include routines, programs, objects, components, logic, data structures, and so on that perform particular tasks or implement particular abstract data types. Computer system 400 may be practiced in distributed cloud computing environments where tasks are performed by remote processing devices that are linked through a communications network. In a distributed cloud computing environment, program modules may be located in both local and remote computer system storage media including memory storage devices.

The SUT 11 and/or the testing system 12 can be a computer system 400 in one or more embodiments of the present invention. Alternatively, or in addition, the SUT 11 and/or the testing system 12 are part of the computer system 400 in one or more embodiments of the present invention.

As shown in FIG. 4, the computer system 400 has one or more central processing units (CPU(s)) 401a, 401b, 401c, etc. (collectively or generically referred to as processor(s) 401). The processors 401 can be a single-core processor, multi-core processor, computing cluster, or any number of other configurations. The processors 401, also referred to as processing circuits, are coupled via a system bus 402 to a system memory 403 and various other components. The system memory 403 can include a read only memory (ROM) 404 and a random access memory (RAM) 405. The ROM 404 is coupled to the system bus 402 and may include a basic input/output system (BIOS), which controls certain basic functions of the computer system 400. The RAM is read-write memory coupled to the system bus 402 for use by the processors 401. The system memory 403 provides temporary memory space for operations of said instructions during operation. The system memory 403 can include random access memory (RAM), read only memory, flash memory, or any other suitable memory systems.

The computer system 400 comprises an input/output (I/O) adapter 406 and a communications adapter 407 coupled to the system bus 402. The I/O adapter 406 may be a small computer system interface (SCSI) adapter that communicates with a hard disk 408 and/or any other similar component. The I/O adapter 406 and the hard disk 408 are collectively referred to herein as a mass storage 410.

Software 411 for execution on the computer system 400 may be stored in the mass storage 410. The mass storage 410 is an example of a tangible storage medium readable by the processors 401, where the software 411 is stored as instructions for execution by the processors 401 to cause the computer system 400 to operate, such as is described herein below with respect to the various Figures. Examples of computer program product and the execution of such instruction is discussed herein in more detail. The communications adapter 407 interconnects the system bus 402 with a network 412, which may be an outside network, enabling the computer system 400 to communicate with other such systems. In one embodiment, a portion of the system memory 403 and the mass storage 410 collectively store an operating system, which may be any appropriate operating system, such as the z/OS or AIX operating system from IBM Corporation, to coordinate the functions of the various components shown in FIG. 4.

Additional input/output devices are shown as connected to the system bus 402 via a display adapter 415 and an interface adapter 416 and. In one embodiment, the adapters 406, 407, 415, and 416 may be connected to one or more I/O buses that are connected to the system bus 402 via an intermediate bus bridge (not shown). A display 419 (e.g., a screen or a display monitor) is connected to the system bus 402 by a display adapter 415, which may include a graphics controller to improve the performance of graphics intensive applications and a video controller. A keyboard 421, a mouse 422, a speaker 423, etc. can be interconnected to the system bus 402 via the interface adapter 416, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 4, the computer system 400 includes processing capability in the form of the processors 401, and, storage capability including the system memory 403 and the mass storage 410, input means such as the keyboard 421 and the mouse 422, and output capability including the speaker 423 and the display 419.

In some embodiments, the communications adapter 407 can transmit data using any suitable interface or protocol, such as the internet small computer system interface, among others. The network 412 may be a cellular network, a radio network, a wide area network (WAN), a local area network (LAN), or the Internet, among others. An external computing device may connect to the computer system 400 through the network 412. In some examples, an external computing device may be an external webserver or a cloud computing node.

It is to be understood that the block diagram of FIG. 4 is not intended to indicate that the computer system 400 is to include all of the components shown in FIG. 4. Rather, the computer system 400 can include any appropriate fewer or additional components not illustrated in FIG. 4 (e.g., additional memory components, embedded controllers, modules, additional network interfaces, etc.). Further, the embodiments described herein with respect to computer system 400 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source-code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instruction by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other devices to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

What is claimed is:

1. A method for flexible test program generation by altering previously used resources, the method comprising:
    scanning, by a test generator, a set of instructions that have been executed by a system under test (SUT) using a reference model of the SUT;
    identifying, by the test generator, a resource for using in a test program by determining an allocation of a first value to the resource by a subset of instructions from the set of instructions;
    modifying, by the test generator, the subset of instructions to allocate a second value to the resource;
    adding, by the test generator, to the set of instructions, at least one instruction that uses the second value of the resource to perform a predetermined operation; and
    testing, by the test generator, the SUT based on a result of the predetermined operation that uses the second value.

2. The method of claim 1, wherein the set of instructions is a predetermined number of instructions that were recently executed by the SUT.

3. The method of claim 1, wherein the set of instructions comprises instructions that were executed by the SUT within a predetermined amount of time.

4. The method of claim 1, wherein testing the SUT based on the result of the predetermined operation further comprises:
    storing, by the test generator, the set of instructions with the modified subset of instructions as part of the test program.

5. The method of claim 1, wherein the resource is one from a group of resources consisting of registers, memory locations, and storage disk locations.

6. The method of claim 1, wherein identifying the resource further comprises determining that the resource is not constrained from being used in the test program.

7. The method of claim 1, wherein modifying the subset of instructions for allocating the second value to the resource does not alter a control flow of the set of instructions.

8. A system comprising:
    a memory device; and
    one or more processing units coupled with the memory, and with a system under test (SUT), wherein the one or more processing units perform a method for generating a test program for the SUT, the method comprising:
        scanning a set of instructions that have been executed by a system under test (SUT) using a reference model of the SUT;
        identifying a resource for using in a test program by determining an allocation of a first value to the resource by a subset of instructions from the set of instructions;
        modifying the subset of instructions to allocate a second value to the resource;
        adding to the set of instructions, at least one instruction that uses the second value of the resource to perform a predetermined operation; and
        testing the SUT based on a result of the predetermined operation that uses the second value.

9. The system of claim 8, wherein the set of instructions is a predetermined number of instructions that were recently executed by the SUT.

10. The system of claim 8, wherein the set of instructions comprises instructions that were executed by the SUT within a predetermined duration.

11. The system of claim 8, wherein testing the SUT based on the result of the predetermined operation further comprises:
    storing, by the test generator, the set of instructions with the modified subset of instructions as part of the test program.

12. The system of claim 8, wherein the resource is one from a group of resources that consists of registers, memory locations, and storage disk locations.

13. The system of claim 8, wherein identifying the resource further comprises determining that the resource is not constrained from using in the test program.

14. The system of claim 8, wherein modifying the subset of instructions for allocating the second value to the resource does not alter a control flow of the set of instructions.

15. A computer program product comprising a memory storage device having computer executable instructions stored thereon, the computer executable instructions when executed by one or more processing units cause the one of more processing units to perform a method for flexible test program generation by altering previously used resources, the method comprising:
    scanning a set of instructions that have been executed by a system under test (SUT) using a reference model of the SUT;
    identifying a resource for using in a test program by determining an allocation of a first value to the resource by a subset of instructions from the set of instructions;
    modifying the subset of instructions to allocate a second value to the resource;
    adding to the set of instructions at least one instruction that uses the second value of the resource to perform a predetermined operation; and
    testing the SUT based on a result of the predetermined operation that uses the second value.

16. The computer program product of claim 15, wherein the set of instructions is a predetermined number of instructions that were recently executed by the SUT.

17. The computer program product of claim 15, wherein the set of instructions comprises instructions that were executed by the SUT within a predetermined duration.

18. The computer program product of claim 15, wherein testing the SUT based on the result of the predetermined operation further comprises:
 storing the set of instructions with the modified subset of instructions as part of the test program.

19. The computer program product of claim 15, wherein the resource is one from a group of resources that consists of registers, memory locations, and storage disk locations.

20. The computer program product of claim 15, wherein identifying the resource further comprises determining that the resource is not constrained from using in the test program.

* * * * *